United States Patent Office 2,824,865
Patented Feb. 25, 1958

2,824,865

DISAZO- AND POLYAZO-DYESTUFFS AND COMPLEX METAL COMPOUNDS THEREOF AND PROCESS FOR THEIR MANUFACTURE

Oskar Weber, Reinach, Walter Anderau and Raymond Gunst, Binningen, and Bernhard Ruetimeyer, Neuallschwil, Switzerland, assignors to Ciba Limited, Basel, Switzerland, a Swiss firm No Drawing. Application August 29, 1955
Serial No. 531,256

Claims priority, application Switzerland
September 2, 1954

7 Claims. (Cl. 260—146)

This invention provides new disazo- and polyazo-dyestuffs of the type of the dyestuff of the formula (1)
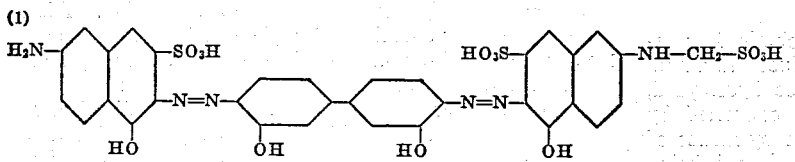

and complex metal compounds thereof, for example, complex copper compounds of the type of the formula (2)
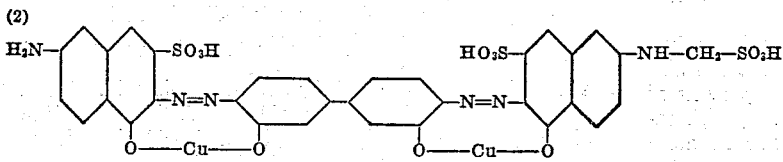

These dyestuffs correspond to the general formula (3)
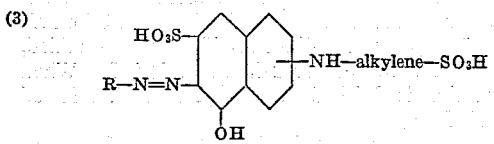

in which the —NH-alkylene-SO$_3$H group occupies a $\beta$-position, R—N=N— represents the radical of a diazo-compound containing in ortho-position to the diazo group a group capable of forming complexes, and the radical R represents a radical containing at least one further azo linkage.

The invention also provides a process for the manufacture of dyestuffs of the above Formula 3 by a method in itself known by using as a coupling component a 1-hydroxy-naphthalene-3-sulfonic acid which contains an amino group in a $\beta$-position of the ring not containing the hydroxyl group, and a diazo-compound which contains in a position vicinal to the diazo group a group capable of taking part in the formation of complex metal compounds, if desired, treating the dyestuff with an agent yielding metal and, if the dyestuff contains only a single azo-linkage, linking a second dyestuff molecule to a nitrogen-containing substituent, wherein in the course of the preparation of the dyestuff the amino group present in the aforesaid coupling component is treated with an agent capable of converting the amino group into an N-alkylene-sulfonic acid group.

The amino group may be converted into an N-alkylene-sulfonic acid group, for example, before or after the coupling.

Thus, the dyestuffs can be made with advantage in this manner by using as coupling-components at least once a 1-hydroxynaphthalene-3-sulfonic acid which contains an —N-alkylene-sulfonic acid group in a $\beta$-position of the ring not containing the hydroxyl group, and at least one diazo- or diazoazo-compound being used which contains in ortho-position to the diazo group a group capable of forming complexes.

The naphthalene derivatives to be used as coupling components correspond to the general formula (4)
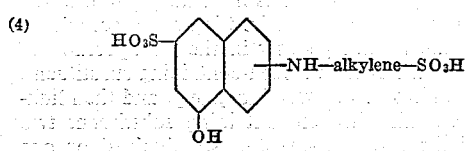

in which the —NH-alkylene-SO$_3$H group occupies a $\beta$-position of the naphthalene ring. Of special advantage in the present process are those derivatives, in which only one carbon atom of the alkylene radical is between the —NH— and the —SO$_3$H groups, and especially those in which the alkylene radical consists only of a —CH$_2$-group.

Such derivatives are easily obtainable by reacting an appropriate amino-hydroxy-naphthalene sulfonic acid with

—NH—CH$_2$—SO$_3$H the addition compound of formaldehyde with an alkali metal bisulfite.

As diazo-compounds, which may contain one or more azo linkages, and thus yield disazo or polyazo-dyestuffs directly when coupled with the aforesaid coupling components, there are used in the present process those which contain in ortho-position to the coupling diazo-group a group capable of forming complexes, especially a hydroxyl group, a carboxyl group, a —OCH$_2$COOH group or an alkoxy group, which advantageously contains an alkyl radical of low molecular weight, which is capable of yielding by metallization, if desired, with the splitting off of the alkyl radical, for example, an ortho:ortho'-dihydroxy-azo-grouping in the metallized condition. As examples of such diazo-compounds there may be used chain dyestuffs, which are obtained by coupling diazotized aminosalicylic acid or a 2-(aminophenyl)-benzthiazole sulfonic acid, for example, a dehydrothiotoluidine sulfonic acid, with a middle component, for instance a middle component of the benzene series, and further diazotizing the amino-azo-dyestuff so obtained. There may be used as middle components amines of the benzene or naphthalene series, which couple in para-position to the amino group and contain in ortho-position to the amino group a substituent capable of forming complex metal compounds, for example, 1-amino-2-methoxy-5-methylbenzene or 1-aminobenzene-2-carboxylic acid.

In the present process tetrazotized 4:4'-diamino-diphenyl compounds are especially valuable which contain in the 3- and 3'-positions a group capable of forming metal complexes, for example, a carboxyl group, an

—O—CH$_2$COOH group or especially a methoxy or hydroxyl group. It is especially simple to manufacture disazo-dyestuffs by starting from tetrazo-compounds since these tetrazo-compounds may be coupled with two identical or different coupling components of the Formula 4 or with any desired coupling component, advantageously one capable of coupling in ortho-position to a hydroxyl group, for example, such a coupling component of the naphthalene series or a pyrazolone, and with a coupling component of the Formula 4.

Further valuable dyestuffs can be made by the present process by coupling a compound of the Formula 4 with a diazo-compound which contains in ortho-position to the diazo group a group capable of forming metal complexes as aforesaid and, advantageously in the para-position to the diazo group, a further nitrogen-containing substituent, for example, a nitro or acetylamino group, and then linking together at this nitrogen-containing substituent two molecules of the monoazo-dyestuff so obtained or one molecule of such dyestuff and one molecule of another dyestuff likewise containing such a substituent. Thus, for example, dyestuffs containing nitro groups may be treated with mild reducing agents, advantageously with glucose in an aqueous solution of an alkali metal hydroxide, whereby linking together of the monoazo-dyestuffs containing nitro groups takes place with the formation of an azo- or azoxy-linkage.

Alternatively, in the monoazodyestuffs obtained as described above the nitro groups may be reduced to amino groups or the acetylamino groups may be hydrolyzed, and the amino-azo-dyestuffs so obtained converted by means of phosgene into urea derivatives or by means of cyanuric chloride into aminotriazine derivatives, it being possible by linking together two different monoazo-dyestuffs to produce disazo-dyestuffs of a symmetrical constitution.

As already mentioned, the disazo- and polyazo-dyestuffs obtainable in the manner described above can also be obtained by using, instead of coupling components of the Formula 4, the corresponding amino-hydroxynaphthalene sulfonic acids unsubstituted at the nitrogen atom and introducing the —NH-alkylene-SO$_3$H group after coupling, for example, immediately after coupling or if desired, after linking the monazo-dyestuffs together. Thus, a disazo- or polyazo-dyestuff, for example, which is obtainable by using as coupling component a 1-hydroxynaphthalene-3-sulfonic acid containing an amino group in a β-position of the ring not containing the hydroxyl group and at least one diazo- or diazo-azo-compound, which contains a group capable of forming complexes in ortho-position to the diazo group, is treated with an agent capable of converting the amino group into an N-alkyl-sulfonic acid group. As such agents there may be used, for example, β-chlorethane sulfonic acid, but especially the above-mentioned addition compounds of aldehydes, advantageously formaldehyde, with bisulfites.

The disazo- and polyazo-dyestuffs obtainable as described above can be converted in the usual manner on the fiber, in the dyebath or especially in substance into their complex metal compounds, for example, complex chromium, cobalt, nickel and especially copper compounds. It is of advantage, when an ortho-alkoxy-diazo-compound is used, to employ a metallization process which leads to an ortho:ortho'-dihydroxy-azo-grouping accompanied by the splitting off of the alkyl group of the diazo-component, for example, by prolonged heating with an ammoniacal solution of a copper salt or by using a process in which the heating with a copper complex is carried out in the presence of ethanolamine.

In some cases, for example, when tetrazo-compounds of 3:3'-diaminodiphenyl are used, it is of advantage to add to the coupling mixture an agent yielding metal, especially an agent yielding copper.

The dyestuffs of this invention and their complex metal compounds, especially their complex copper compounds are suitable for dyeing a very wide variety of materials, for example animal fibers such as wool or leather, but especially for dyeing or printing fibrous materials of natural or regenerated cellulose, such as cotton, linen, and artificial silk or staple fibers of regenerated cellulose. There are produced in this manner, especially when copper-containing dyestuffs are used or the dyestuffs are coppered on the fiber, fast dyeings, and especially dyeings fast to washing and light, which, if desired, may be subjected to an after-treatment and further improved in their properties of fastness. As after-treatments there come into consideration an anti-creasing treatment with a urea-formaldehyde resin, and a treatment with a condensation product of formaldehyde and dicyandiamidine and similar products.

The following examples illustrate the invention, the parts and percentages being by weight:

*Example 1*

21.6 parts of 3:3'-dihydroxy-4:4'diaminodiphenyl are tetrazotized in the usual manner. The neutralized and filtered tetrazo-compound is introduced at 5–10° C. into a mixture of 66.6 parts of 2-(sulfomethylamino)-5-hydroxynaphthalene-7-sulfonic acid, 80 parts of anhydrous sodium carbonate, 100 parts of pyridine and 800 parts of water. There are also added 50 parts of copper sulfate in 200 parts of concentrated ammonia solution. After a few hours the coupling is complete, and the copper compound of the disazo-dyestuff is filtered off. The pyridine used can then be regenerated in known manner.

The dry dyestuff is a dark powder which dissolves in concentrated sulfuric acid with a blue green coloration. It dyes cotton and regenerated cellulose pure blue tints of very good fastness to light and washing.

The same dyestuff can be obtained as follows:

21.6 parts of 3:3'-dihydroxy-4:4'-diaminodiphenyl are tetrazotized in the usual manner and coupled in the presence of calcium hydroxide and pyridine with 47.8 parts of 2-amino-5-hydroxynaphthalene-7-sulfonic acid. When the coupling is finished the pyridine is distilled off. The diazo-dyestuff is precipitated with hydrochloric acid of 30 percent strength and filtered off. The dyestuff paste is then neutralized with a concentrated solution of sodium hydroxide. An aqueous solution of 6.0 parts of formaldehyde and 20.8 parts of sodium bisulfite are then added, and the mixture is heated for 2 hours at 85° C. When the condensation is finished, the temperature is allowed to fall to 40° C.

For the purpose of metallization 60 parts of concentrated ammonia and 50 parts of crystalline copper sulfate are added. After stirring the mixture for one hour at 40° C. it is filtered.

The dried dyestuff has the properties described in the second paragraph of this example.

A dyestuff which dyes cotton and regenerated cellulose grey tints is obtained by using as coupling component in the manner described in the first paragraph, 2-(sulfomethylamino)-8-hydroxynaphthalene-6-sulfonic acid.

By following the procedure described in the first paragraph of this example, but, using, instead of copper sulfate, a corresponding quantity of nickel sulfate there is obtained a dyestuff which dyes cotton somewhat more reddish blue tints than the copper-containing dyestuff.

*Example 2*

21.6 parts of 3:3'-dihydroxy-4:4'-diaminodiphenyl are tetrazotized in the usual manner and the tetrazo-suspension is neutralized and the tetrazo compound filtered off. The so-obtained paste is then introduced at 10–15° C. into a suspension of 66.6 parts of 2-(sulfomethylamino)-5-hydroxynaphthalene-7-sulfonic acid, 29.6 parts of calcium hydroxide, 60 parts of pyridine and 800 parts of water. When the reaction is finished, the pyridine is distilled off and the coupling mixture remaining behind is mixed with a solution of 35 parts of anhydrous sodium carbonate in 350 parts of water, the mixture is filtered to remove calcium carbonate, and the dyestuff is metallized by the addition of 50 parts of copper sulfate in 200 parts of concentrated ammonia solution. After stirring the mixture for one hour at 40° C., the copper compound of the disazo-dyestuff is salted out and filtered off. The dried dyestuff has the properties described in the second paragraph of Example 1.

Example 3

24.4 parts of 3:3'-dimethoxy-4:4'-diaminodiphenyl are dissolved in 300 parts of water with 25 parts of hydrochloric acid of 30 percent strength. After the addition of a further 25 parts of hydrochloric acid tetrazotization is brought about at 2–5° C. with 14 parts of sodium nitrite. The clear solution of the tetrazo-compound is run at 0–5° C. into a solution of 66.6 parts of 2-(sulfomethylamino)-5-hydroxynaphthalene-7-sulfonic acid and 80 parts of sodium carbonate in 300 parts of water. After 15–20 minutes the reaction is finished. The mixture is then heated to 70° C. and the dyestuff is filtered off.

The dyestuff paste so obtained is diluted with 700 parts of water, the mixture is heated to 80° C., and a solution of 50 parts of copper sulfate in 200 parts of concentrated ammonia solution is added. After stirring the mixture for 10 hours at 80–85° C., the metallization is complete and the new dyestuff is salted out and filtered off. It has the same properties as the corresponding dyestuffs described in Examples 1 and 2.

Example 4

21.6 parts of 3:3'-dihydroxy-4:4'-diaminodiphenyl are tetrazotized in the usual manner, and the neutralized and filtered tetrazo-compound is introduced at 0–5° C. into a mixture of 23.9 parts of 2-amino-5-hydroxynaphthalene-7-sulfonic acid, 40 parts of sodium carbonate, 120 parts of pyridine and 800 parts of water. The whole is stirred overnight and the next day the diazo-azo-compound is filtered off, and the paste so obtained is coupled with a solution of 33.3 parts of 2-(sulfomethylamino)-5-hydroxynaphthalene-7-sulfonic acid, 60 parts of sodium carbonate, 120 parts of pyridine, 50 parts of copper sulfate, 69 parts of concentrated ammonia solution in 600 parts of water. After stirring for several hours at room temperature, the coupling is complete and the new dyestuff is filtered off. The dried cupriferous dyestuff is a dark powder which dissolves in concentrated sulfuric acid with a blue-green coloration. It dyes cotton and regenerated cellulose blue tints of very good fastness to light and washing.

Example 5

By using in Example 4, instead of 2-amino-5-hydroxynaphthalene-7-sulfonic acid, 2-hydroxynaphthalene-3:6-disulfonic acid, there is obtained a similar dyestuff which dyes cotton and regenerated cellulose reddish blue tints of very good fastness to light and washing.

Example 6

24.2 parts of 3:3'-dimethoxy-4:4'-diaminodiphenyl are tetrazotized in the usual manner and the tetrazo-compound is coupled while stirring well with ice-cold solution of 33.3 parts of 2-(sulfomethylamino)-8-hydroxynaphthalene-6-sulfonic acid and 80 parts of anhydrous sodium carbonate in 600 parts of water. After 5 to 10 minutes the formation of the diazomonoazo-compound is complete, a solution of 29 parts of 1-(2'-naphthyl)-3-methyl-5-pyrazolone-5':7'-disulfonic acid and 30 parts of anhydrous sodium carbonate in 300 parts of water is added, and the whole is stirred for a further 2–3 hours at room temperature.

In order to convert the dyestuff into its complex copper compound there are added to the dyestuff suspension 150 parts of ammonia solution of 24 percent strength, 15 parts of monoethanolamine and a solution of 50 parts of crystalline copper sulfate in 200 parts of water, and the whole is stirred for 6 hours at 95–100° C. under reflux. By the addition of sodium chloride and allowing the mixture to cool, while stirring, the copper complex of the dyestuff so formed separates out and can be filtered off and dried. It is a dark powder which dissolves in water with a grey-violet coloration and dyes cellulose fibers bluish grey tints which are fast to light.

Example 7

32 parts of 2-(4'-aminophenyl)-6-methylbenzthiazole sulfonic acid (obtainable by sufonating 2-(4'-aminophenyl)-6-methyl-benzthiazole with concentrated sulfuric acid) are dissolved in the form of the sodium salt in 200 parts of water, and 6.9 parts of sodium nitrite are added. The solution is slowly run into a mixture of 30 parts of hydrochloric acid of 30 percent strength, 100 parts of water and 100 parts of ice. The whole is stirred for one hour, and then the suspension of the diazo-compound is introduced into a solution of 21.7 parts of 1-amino-2-methoxybenzene-ω-methane sulfonic acid, which solution contains an excess of sodium bicarbonate, and the whole is stirred at 10° C. until the coupling is complete. The monoazo-dyestuff is then separated off, and hydrolyzed by heating it for one hour at 90° C. with a dilute solution of sodium hydroxide. The amino-monoazo-dyestuff is separated from the mixture, dissolved in water with the addition of sodium carbonate until the reaction is weakly alkaline, then 7 parts of sodium nitrite are added, and diazotization is brought about by pouring in 30 parts of hydrochloric acid of 30 percent strength. The whole is stirred for 2 hours at about 45° C., and the diazo-compound is coupled in a solution rendered alkaline with sodium carbonate or sodium bicarbonate with 33.3 parts of 2 - (sulfomethylamino) - 8 - hydroxynaphthalene - 6 - sulfonic acid. Coupling is strongly accelerated by the addition of a small amount of pyridine or picoline. When the coupling is finished the disazo-dyestuff is salted out and filtered off.

The dyestuff paste is dissolved in 1500 parts of water with the addition 30 parts of monoethanolamine, and the solution is mixed with an ammoniacal solution of copper sulfate (corresponding to 27.5 parts of $CuSO_4.5H_2O$). The treatment is carried out for 4 hours at 95° C. under reflux. The complex copper compound so obtained is salted out, filtered off and dried. There is obtained a grey powder, which dissolves in water with a grey coloration, and dyes cotton greenish grey tints which are fast to light.

Example 8

16.8 parts of 4-nitro-2-methoxy-1-aminobenzene are suspended with 35 parts of concentrated hydrochloric acid in 600 parts of water and 7 parts of sodium nitrite are added at 4° C. There is obtained a clear solution of the diazo-compound, which is added to an ice-cold solution of 35 parts of 2-(sulfomethylamino)-5-hydroxynaphthalene-7-sulfonic acid and 50 parts of anhydrous sodium carbonate in 600 parts of water.

After heating the mixture for 2 hours at 65° C., 90 parts of sodium hydroxide solution of 30 percent strength are added, and then a solution of 17–17.8 parts of dextrose in 60 parts of water is added. A color change occurs. After 10 minutes there are added 110 parts of sodium bicarbonate and also 200 parts of sodium chloride, whereupon the dyestuff precipitates. It is filtered off, and the filter paste is dissolved in 700 parts of water at 70° C., and 70 parts of ammonia solution of 24 percent strength and an aqueous solution of 25 parts of crystalline copper sulfate are added. The whole is stirred for 6 hours at 85–90° C., 100 parts of sodium chloride are added, and the dyestuff obtained by this demethylating coppering treatment is filtered off and dried in vacuo at 80–90° C.

There is obtained a blackish powder, which dissolves in water and in dilute alkalies with a grey-blue coloration. It dyes vegetable fibers and artificial fibers of regenerated cellulose grey tints which are very fast to light.

Example 9

18.2 parts of 5-nitro-2-aminobenzene-1-carboxylic acid are diazotized indirectly in the usual manner. The diazo-suspension is run at 0–5° C. into a mixture of 33.3 parts of 2-(sulfomethylamino)-8-hydroxynaphthalene-6-sulfonic acid, 32 parts of ammonium carbonate and 200 parts of water while the pH value is kept constant at 7.8–8.1 by the addition of sodium hydroxide solution of 10 percent strength. After 2–3 hours the coupling is finished and the dyestuff partially precipitates. The monoazo-dyestuff is salted out and when dry is a dark brown powder.

52.6 parts of the resulting monoazo-dyestuff containing a nitro group are dissolved in 1000 parts of water at 50° C. 40 parts of sodium hydroxide are added in the form of a solution of 30 percent strength, and there are immediately poured in in one portion 100 parts by volume of a solution of dextrose of 10 percent strength at 60° C. After a reaction time of 10 minutes at 50–60° C. the dyestuff partially precipitates out. 150 parts of sodium bicarbonate are added, and the dyestuff is precipitated after 10 minutes by the addition of sodium chloride. The mixture is filtered at 40–50° C. The dried dyestuff is a dark powder which dissolves in concentrated sulfuric acid with a blue-green coloration. It dyes cotton and regenerated cellulose reddish violet-grey tints, which when treated with an agent yielding copper change to a neutral grey of good fastness to washing and light.

Example 10

33.2 parts of 4:4'-diamino-3:3'-dicarboxymethyoxy-1:1'-diphenyl are tetrazotized in the usual manner and treated with a solution, rendered alkaline with sodium carbonate, of 66.6 parts of 2-(sulfo-methylamino)-8-hydroxynaphthalene-6-sulfonic acid in 500 parts of water, and 35 parts of sodium carbonate at 0° C. After half an hour, the symmetrical dyestuff is salted out with 20% sodium chloride.

The product is a dark blue powder which dissolves in concentrated sulfuric acid with a clear blue coloration and dyes cotton and regenerated cellulose blue tints. In the form of the free acid it corresponds to the formula

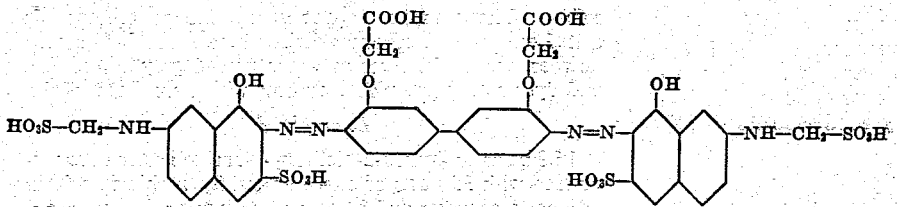

20.4 parts of the aforementioned disazo dyestuff, in the form of the sodium salt, are dissolved in 300 parts of water at 80° C. There are added drop by drop in the course of one hour at 85–95° C. 10 parts of crystalline aqueous copper sulfate, dissolved in 100 parts of water and 30 parts of concentrated ammonia and 10 parts of ethanolamine. Coppering is complete after 1½ hours. After neutralization of the medium the dyestuff is salted out with 10% sodium chloride. It is a dark, rather difficultly soluble powder having a metallic luster and dyes cotton and regenerated cellulose slightly bluish grey tints of good fastness.

Example 11

100 parts of cotton are entered at 40° C. into a bath

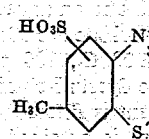

which contains in 3000 parts of water, 0.8 part of the

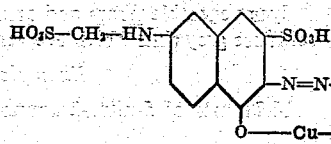

cupriferous dyestuff obtained as described in the first and second or third paragraphs of Example 1, dyeing is carried on while raising the temperature to 90° C., and 30 parts of crystalline sodium sulfate are added, and dyeing is continued for a further ½ hour at 90–95° C. The cotton is then rinsed and finished in the usual manner. It is dyed a pure blue tint and the dyeing has a very good fastness to light and washing.

What is claimed is:

1. A metalliferous azo-dyestuff of the formula

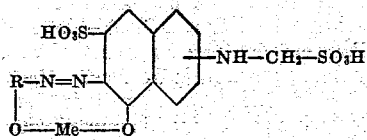

in which the —NH—CH$_2$—SO$_3$H group occupies a β-position and

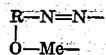

represents a radical selected from the group consisting of the radicals of the formulae

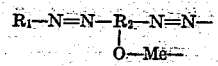

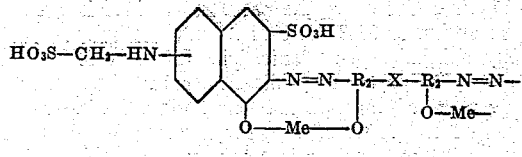

and

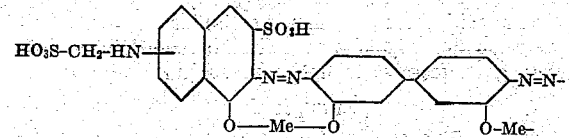

wherein R$_1$ represents the radical of a 2-(aminophenyl)-benzthiazole sulfonic acid, R$_2$ represents a benzene radical, X represents a member selected from the group consisting of azo- and azoxy groups, Me represents a metal having an atomic number of at least 28 and at the most 29 and all the —O—Me— groups are in ortho-position to the azo linkages.

2. A cupriferous azo dyestuff of the formula

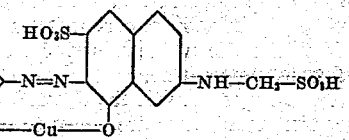

3. A cupriferous azo dyestuff of the formula

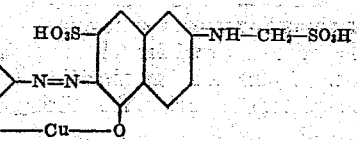

in which X represents a member selected from the group

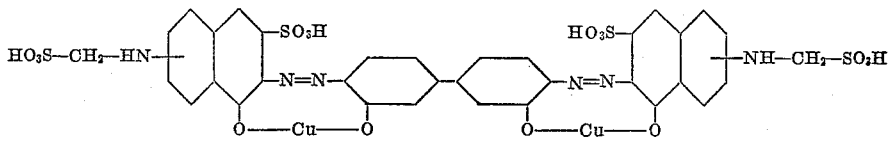

consisting of an azo group and an azoxy group.

4. A cupriferous azo dyestuff of the formula

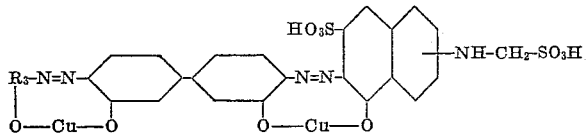

in which $R_3$ represents a naphthalene radical containing at least one sulfonic acid group and bound to the azo- linkage in ortho-position to the —O—Cu— group, and the —NH—CH$_2$—SO$_3$H group occupies a β-position.

5. A cupriferous azo dyestuff of the formula

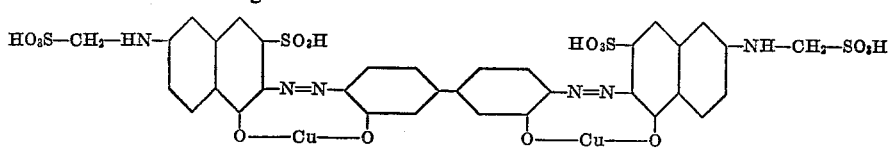

in which both —NH—CH$_2$—SO$_3$H groups occupy β-positions.

6. The cupriferous azo dyestuff of the formula

7. The cupriferous azo dyestuff of the formula

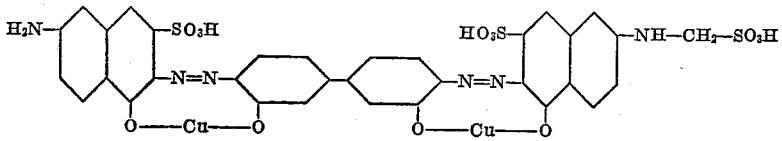

References Cited in the file of this patent

UNITED STATES PATENTS 2,630,431   Trepagnier _____ Mar. 3, 1953

FOREIGN PATENTS 276,905   Switzerland _____ July 31, 1951